United States Patent
Onusseit

(10) Patent No.: US 6,607,629 B2
(45) Date of Patent: *Aug. 19, 2003

(54) PROCESS FOR THE PERFECT BINDING OF PRINTED ARTICLES

(75) Inventor: Hermann Onusseit, Haan (DE)

(73) Assignee: Henkel Kommanditgesellschaft auf Aktien, Duesseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/380,725

(22) PCT Filed: Mar. 5, 1998

(86) PCT No.: PCT/EP98/01228

§ 371 (c)(1),
(2), (4) Date: Sep. 7, 1999

(87) PCT Pub. No.: WO98/40225

PCT Pub. Date: Sep. 17, 1998

(65) Prior Publication Data

US 2002/0157780 A1 Oct. 31, 2002

(30) Foreign Application Priority Data

Mar. 7, 1997 (DE) .......................................... 197 09 413

(51) Int. Cl.[7] ................................................. B42C 9/00
(52) U.S. Cl. ........................ 156/275.7; 156/908; 412/4; 412/6; 412/8; 412/900
(58) Field of Search ............................. 156/908, 275.7; 412/4, 8, 5, 900, 6; 522/31

(56) References Cited

U.S. PATENT DOCUMENTS

| 2,968,336 | A | * | 1/1961 | Martin et al. ............. 156/275.7 |
| 3,837,994 | A | * | 9/1974 | Flanagan et al. ............... 412/8 |
| 4,356,050 | A | * | 10/1982 | Crivello et al. ................ 522/31 |
| 4,360,540 | A | * | 11/1982 | Chong ......................... 156/326 |
| 4,370,358 | A | * | 1/1983 | Hayes et al. ................... 522/31 |
| 4,394,403 | A | * | 7/1983 | Smith ........................... 522/31 |
| 4,412,048 | A | | 10/1983 | Dixon et al. |
| 4,605,465 | A | * | 8/1986 | Morgan .................... 156/275.7 |
| 5,057,551 | A | | 10/1991 | Gonzalez et al. |
| 5,154,791 | A | * | 10/1992 | Gasser et al. ............ 156/275.7 |
| 6,207,248 | B1 | * | 3/2001 | Yang et al. ..................... 412/8 |

FOREIGN PATENT DOCUMENTS

| CA | 2 091 384 | 6/1998 |
| EP | 0 568 803 | 11/1993 |
| JP | 02 090973 | 3/1990 |
| JP | 05 069686 | 3/1993 |
| WO | WO85/04669 | 10/1985 |

OTHER PUBLICATIONS

Patent Abstracts of Japan, vol. 017, No. 389 (1993).
Database WPI, Class A14, AN90–144285, XP002069132.

* cited by examiner

Primary Examiner—Jeff H. Aftergut
Assistant Examiner—John T. Haran
(74) Attorney, Agent, or Firm—Stephen D. Harper; Daniel S. Ortiz

(57) ABSTRACT

Adhesive systems comprised of one or more photoinitiators and one or more adhesives capable of radiation-induced reaction are useful in one-step or multi-step perfect binding of books and other printed articles. The adhesive may be a low viscosity mixture of a monomer and/or polymer which is cross-linkable by UV or stronger electromagnetic radiation.

35 Claims, No Drawings

PROCESS FOR THE PERFECT BINDING OF PRINTED ARTICLES

BACKGROUND OF THE INVENTION

1. Field of the Invention

This invention relates to an adhesive system based on at least one adhesive for a one-step or multi-step perfect binding process and to a process for the perfect binding of brochures, books, catalogues, writing pads and similar printed articles using this process.

2. Discussion of the Related Art

Perfect binding has long been successfully used for the rapid and economic production of books, catalogues, writing pads and brochures. In perfect binding processes, the function of the adhesive is, on the one hand, to hold the individual pages together along one edge, on the other hand, to affix a cover or a liner around the inner book.

Optimal bonding of the individual pages is achieved if the individual page edges can be thoroughly wetted by the adhesive, for which purpose low-viscosity adhesives (for example hotmelt adhesives or dispersion adhesives) are generally preferred.

However, the pickup of the covers generally requires products of higher viscosity because the covers partly consist of papers with very high weights per unit area which are very bulky and can only be safely picked up providing the adhesive has a certain initial tackiness.

If only one adhesive can be used (one-shot process), the viscosity has to be selected so that adequate page edge adhesion and safe pickup of the liner are guaranteed. Since these two requirements cannot always be satisfied by a single adhesive, the idea of introducing the so-called two-shot process was adopted at an early stage. In the two-shot process, two different adhesives are used one after the other. In a first step, the inner book is very thinly coated with a dispersion or a hotmelt adhesive, preferably in a layer thickness of less than 0.2 mm. Where a dispersion is used, the adhesive can be dried in a matter of seconds in the machine, for example using an infrared dryer. The second adhesive is then applied in a second step. Depending on the system, the second adhesive is a dispersion adhesive at room temperature or a hotmelt adhesive at temperatures of 120 to 200° C. In the two-shot process, the low-viscosity adhesive is responsible for page adhesion in step 1 while the high-viscosity dispersion adhesive or hotmelt adhesive is responsible for the strength of the inner book in step 2.

One example of a two-shot process is described in WO 85/04669. In this process, a water-based coupling agent is used as the first adhesive while a hotmelt adhesive is used as the second adhesive, the hotmelt adhesive containing a segmented monoalkylene/vinyl acetate copolymer and the water-based coupling agent containing an aqueous rubber latex emulsion. Accordingly, in this process, a non-reactive low-viscosity adhesive is initially applied in the form of a dispersion while the hotmelt adhesive is applied after drying of this layer, as described above.

Reactive systems are used both in one-shot processes, for example in the form of reactive polyurethane hotmelt adhesives, and in two-shot processes, for example in the form of a two-component reactive dispersion and a hotmelt.

EP-A 0 568 803 relates to a book binding process in which a water-based coupling agent and a hotmelt adhesive are successively applied to the spine of an inner book, the coupling adhesive being an aqueous dispersion of a polymeric adhesive resin and an isocyanate hardener. In this two-shot process, therefore, a two-component reactive dispersion is applied first, the hotmelt adhesive being applied after this dispersion has dried.

The disadvantage of the process known from EP-A 0 568 803 is that the polymer to be crosslinked always has to react with another substance in one of the two reaction steps. Accordingly, systems of the type in question either require special application systems to avoid premature crosslinking before application (when the second component is water, for example moisture from the air) or have only a limited pot life (in the case of two-component systems where chemical components are mixed).

BRIEF SUMMARY OF THE INVENTION

The problem addressed by the present invention was to provide an improved adhesive system for a one-step or multi-step perfect binding process for book binding which, in particular, would be easier to handle.

An adhesive system of the type in question is obtained through the presence of at least one photoinitiator so that a low molecular weight component can be hardened by a radical or cationic reaction induced by electromagnetic radiation, for example by UV radiation or more powerful electromagnetic radiation. In addition, known reactive groups, for example NCO groups, may also be present bound either to the same molecules which are capable of the radiation-induced reaction or to different molecules.

Accordingly, the present invention relates to an adhesive system for a one-step or multi-step perfect binding process for book binding, characterized in that it contains at least one photoinitiator and at least one adhesive A which is capable of a radiation-induced reaction.

DETAILED DESCRIPTION OF THE INVENTION

The adhesive systems differs in its composition according to whether it is used in a one-shot process or in a two-shot process.

In the one-shot process, the adhesive system comprises as the adhesive A a radiation-crosslinkable adhesive of a low-viscosity crosslinkable mixture of monomers and/or polymers which has a viscosity of 0.1 to 20 and preferably 0.1 to 10 Pas at the application temperature and which additionally contains at least one photoinitiator.

In the two-shot process, the adhesive system according to the invention comprises the adhesive A, namely a low-viscosity radiation-crosslinkable adhesive (for example solventless or solvent-containing systems or a dispersion) which has a viscosity at the application temperature of 100 to 10,000 mPas and preferably in the range from 100 to 1,000 mPas and which additionally contains at least one photoinitiator, and the adhesive B which has a viscosity at the application temperature of 1,000 to 20,000 mPas and preferably in the range from 5,000 to 10,000 mPas.

Apart from the practically non-existent pot life, the advantage of this system is that there is no need to keep to any mixing ratios and no special applicators are required. This provides for simple production on an industrial scale.

In the context of the present invention, a "multi-step perfect binding process" is understood to be a perfect binding process comprising at least two application steps, the two-shot process being preferred.

A "radiation-induced reaction" is understood to be a radical or cationic reaction in which the molecular weight is increased. Accordingly, adhesive A is based on solventless or solvent-containing mixtures in the form of solutions or aqueous dispersions of, preferably, acrylate monomers and/or acrylate-modified polymers and/or aliphatic epoxy monomers and/or epoxy-modified polymers.

In cases where the molecular weight is increased by a radical reaction, the functional group is quite generally an olefinically unsaturated double bond. According to the invention, olefinically unsaturated double bonds as present, for example, in derivatives of acrylic acid or styrene are preferred. Derivatives of acrylic acid, for example acrylates and methacrylates containing 1 to 16 and preferably 1 to 4 carbon atoms in the alcohol component, are particularly suitable and preferred for the purposes of the invention.

Adhesive A according to the invention preferably contains at least one polymer with a molecular weight of at least 800 as the radically reactive component. Suitable reactive components are any of the polymeric compounds typically used in adhesives, for example polyvinyl acetate, polyvinylidene chloride, polyacrylates, polyesters, polyethers, polycarbonates, polyacetals, polyurethanes, polyolefins or rubber polymers, such as nitrile, chloroprene, isoprene or styrene/butadiene rubber, providing they contain at least one functional group polymerizable by exposure to UV light or to electron beams and optionally at least one functional group capable of reacting with a compound containing at least one acidic hydrogen atom, for example an NCO group.

However, polyacrylates, polyesters or polyurethanes are preferably used as reactive component in the adhesives according to the invention because the polymers mentioned make it particularly easy to attach the functional groups required in accordance with the invention to the polymer molecule.

The polymers suitable for use as reactive component in accordance with the invention can be produced particularly easily from a basic polymer containing at least two isocyanate-reactive functional groups, preferably OH groups, in the polymer molecule. The required functional group can be attached particularly easily to this basic polymer by reaction with a polyisocyanate or a suitably functionalized monoisocyanate.

One example of a suitable basic polymer is a polymer selected from the group consisting of polyesters, polyethers, polycarbonates or polyacetals with a molecular weight ($M_n$) of at least about 200 or mixtures of two or more such polymers which contain terminal OH groups.

Polyesters suitable for use in accordance with the invention as the basic polymer for producing the reactive component may be obtained in known manner by polycondensation of acid and alcohol components, more particularly by polycondensation of a polycarboxylic acid or a mixture of two or more polycarboxylic acids and a polyol or a mixture of two or more polyols.

Polycarboxylic acids suitable in accordance with the present invention for the production of the basic polymer may be based on an aliphatic, cycloaliphatic, araliphatic, aromatic or heterocyclic parent compound and, besides the at least two carboxylic acid groups, may optionally contain one or more substituents which do not react in the course of a polycondensation reaction, for example halogen atoms or olefinically unsaturated double bonds. The free carboxylic acids may even be replaced by their anhydrides (where they exist) or esters with $C_{1-5}$ monoalcohols or mixtures of two or more thereof for the polycondensation reaction. Suitable polycarboxylic acids are, for example, succinic acid, adipic acid, suberic acid, azelaic acid, sebacic acid, glutaric acid, glutaric anhydride, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acids or trimer fatty acids or mixtures of two or more thereof. Small quantities of monofunctional fatty acids may optionally be present in the reaction mixture.

Various polyols may be used as the diols for producing a polyester or polycarbonate suitable for use as the basic polymer. Examples of such polyols are aliphatic polyols containing 2 to 4 OH groups per molecule. The OH groups may be both primary and secondary OH groups. Suitable aliphatic polyols include, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol, and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which are obtained in known manner from a step-by-step extension of the carbon chain by one $CH_2$ group at a time or by introducing branches into the carbon chain, or mixtures of two or more thereof. Other suitable polyols are alcohols of relatively high functionality such as, for example, glycerol, trimethylol propane, pentaerythritol or sugar alcohols, such as sorbitol or glucose, and oligomeric ethers of the substances mentioned either as such or in the form of a mixture of two or more of the compounds mentioned with one another, for example polyglycerol with a degree of polymerization of about 2 to about 4. In the alcohols of relatively high functionality, one or more OH groups may be esterified with monobasic carboxylic acids containing 1 to about 20 carbon atoms, with the proviso that, on average, at least two OH groups remain intact. The higher alcohols mentioned may be used in pure form or, where possible, in the form of the technical mixtures obtainable in the course of their synthesis.

The reaction products of low molecular weight polyfunctional alcohols with alkylene oxides, so-called polyether polyols, may also be used as the polyol component for producing the basic polymers. Polyether polyols, which are to be used for the production of polyesters suitable as the basic polymers, are preferably obtained by reaction of polyols with alkylene oxides. The alkylene oxides preferably contain 2 to about 4 carbon atoms. Suitable polyether polyols are, for example, the reaction products of ethylene glycol, propylene glycol, the isomeric butanediols or hexanediols, as mentioned above, or mixtures of two or more thereof with ethylene oxide, propylene oxide or butylene oxide or mixtures of two or more thereof. Other suitable polyether polyols are products of the reaction of polyfunctional alcohols, such as glycerol, trimethylol ethane or trimethylol propane, pentaerythritol or sugar alcohols or mixtures of two or more thereof, with the alkylene oxide mentioned to form polyether polyols. Polyether polyols with a molecular weight ($M_n$) of about 100 to 3,000 and preferably in the range from about 200 to about 2,000 obtainable from the reactions mentioned are particularly suitable. The polyether polyols mentioned may be reacted with the polycarboxylic acids mentioned above in a polycondensation reaction to form the polyesters suitable for use as the basic polymers.

Polyether polyols formed, for example, as described above are also suitable as OH-terminated basic polymers. Polyether polyols are normally obtained by reacting a starting compound containing at least two reactive hydrogen atoms with alkylene or arylene oxides, for example ethylene oxide, propylene oxide, butylene oxide, styrene oxide, tetrahydrofuran or epichlorohydrin or mixtures of two or more thereof. Suitable starting compounds are, for example, water, ethylene glycol, 1,2- or 1,3-propylene glycol, 1,4- or 1,3-butylene glycol, 1,6-hexanediol, 1,8-octanediol, neopentyl glycol, 1,4-hydroxymethyl cyclohexane, 2-methylpropane-1,3-diol, glycerol, trimethylol propane, hexane-1,2,6-triol, butane-1,2,4-triol, trimethylol ethane, pentaerythritol, mannitol, sorbitol, methyl glycosides, sugars, phenol, isononyl phenol, resorcinol, hydroquinone, 1,2,2- or 1,1,2-tris-(hydroxyphenyl)-ethane, ammonia, methyl amine, ethylenediamine, tetra- or hexamethylenediamine, triethanolamine, aniline, phenylenediamine, 2,4- and 2,6-diaminotoluene and polyphenyl polymethylene polyamines which can be obtained by condensing aniline with formaldehyde.

Polyether polyols modified by vinyl polymers are also suitable for use as the basic polymer. Products such as these can be obtained, for example, by polymerizing styrene or acrylonitrile or a mixture thereof in the presence of polyethers.

A polyether polyol particularly suitable in accordance with the invention for use as the basic polymer is polypropylene glycol with a molecular weight of about 300 to about 1,500.

Polyacetals are also suitable for use as the basic polymer or as the polyol component for producing the basic polymer. Polyacetals are understood to be compounds obtainable by reacting glycols, for example diethylene glycol or hexanediol, with formaldehyde. Polyacetals suitable for the purposes of the invention may also be obtained by polymerizing cyclic acetals.

Polycarbonates are also suitable for use as the basic polymer or as the polyol used for producing the basic polymer. Polycarbonates may be obtained, for example, by reacting the polyols mentioned above, more particularly diols, such as propylene glycol, butane-1,4-diol or hexane-1,6-diol, diethylene glycol, triethylene glycol or tetraethylene glycol or mixtures of two or more thereof, with diaryl carbonates, for example diphenyl carbonate or phosgene.

OH-functional polyacrylates are also suitable as the basic polymer or as the polyol component used for producing the basic polymer. OH-functional polyacrylates may be obtained, for example, by polymerizing ethylenically unsaturated monomers bearing OH groups. Such monomers are obtainable, for example, by esterification of ethylenically unsaturated carboxylic acids and difunctional alcohols, the alcohol generally being present in only a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropyl methacrylate or mixtures of two or more thereof.

If the molecular weight of the basic polymer is too low for use as a reactive component, it may be increased, for example, by chain extension. To this end, the OH-terminated basic polymer is initially reacted with a polyfunctional compound, preferably a difunctional compound (functionality related to the terminal OH groups). Accordingly, in the context of the invention, particularly suitable polyfunctional compounds are polyepoxides, more especially diepoxides, or preferably polyisocyanates, more especially diisocyanates. Diisocyanates are particularly preferred for the purposes of the invention. The stoichiometric ratios between basic polymer and polyfunctional compound required for obtaining a certain increase in molecular weight are known to the expert. In general, however, an excess of basic polymer will be present during the chain-extending reaction to obtain an increase in the length of the chain, the chain-extended basic polymers formed again being terminated by OH groups.

In order to be suitable for use as a reactive component, the OH-terminated, optionally chain-extended basic polymers mentioned above must be provided with at least one functional group polymerizable by exposure to UV light or to electron beams and optionally with at least one functional group polymerizable by reaction with a compound containing at least one acidic hydrogen atom.

To this end, the basic polymers are preferably reacted with a compound which is polyfunctional and preferably difunctional in relation to the terminal OH groups. Suitable polyfunctional compounds for the purposes of the invention are the polyfunctional compounds already usable for chain extension, more especially polyepoxides, particularly diepoxides, but preferably polyisocyanates, especially diisocyanates. Diisocyanates are particularly preferred for the purposes of the present invention. Suitable polyfunctional polyisocyanates which are suitable for reaction with the basic polymers contain on average two to at most about four isocyanate groups. Examples of suitable isocyanates are 1,5-naphthalene diisocyanate, 4,4'-diphenyl methane diisocyanate (MDI), hydrogenated MDI (dicyclohexyl methane diisocyanate, $H_{12}$-MDI), xylylene diisocyanate (XDI), tetramethyl xylylene diisocyanate (TMXDI), 4,4'-diphenyl dimethyl methane diisocyanate and di- and tetraalkyl diphenyl methane diisocyanate, 4,4'-dibenzyl diisocyanate, 1,3-phenylene diisocyanate, 1,4-phenylene diisocyanate, 2,4- and 2,6-toluene diisocyanate (TDI) and mixtures thereof, more particularly a mixture containing about 20% of 2,4- and 80% by weight of 2,6-toluene diisocyanate, 1-methyl-2,4-diisocyanatocyclohexane, 1,6-diisocyanato-2,2,4-trimethyl hexane, 1,6-diisocyanato-2,4,4-trimethyl hexane, 1-isocyanatoethyl-3-isocyanato-1,5,5-trimethyl cyclohexane (IPDI), chlorinated and brominated diisocyanates, phosphorus-containing diisocyanates, 4,4'-diisocyanatophenyl perfluoroethane, tetramethoxy-butane-1,4-diisocyanate, 1,4-butane diisocyanate, 1,6-hexane diisocyanate (HDI), cyclohexane-1,4-diisocyanate, ethylene diisocyanate, phthalic acid-bis-isocyanatoethyl ester; polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates obtainable, for example, by reacting 2 moles of hexamethylene diisocyanate with 1 mole of thiodiglycol or dihydroxydihexyl sulfide are also suitable. Other diisocyanates are trimethyl hexamethylene diisocyanates, 1,4-diisocyanatobutane, 1,2-diisocyanatododecane and dimer fatty acid diisocyanates. Triisocyanatoisocyanurates may be obtained by trimerization of diisocyanates at elevated temperature, for example at around 200° C., and/or in the presence of a catalyst, for example an amine, and may also be used for the purposes of the present invention. According to the invention, the polyisocyanates mentioned may be used either individually or in the form of a mixture of two or more of the polyisocyanates mentioned. A single polyisocyanate or a mixture of two or three polyisocyanates is preferably used for the purposes of the present invention. Preferred polyisocyanates used either individually or in admixture are HDI, MDI or TDI, for example a mixture of MDI and TDI.

The basic polymer is preferably reacted with the polyfunctional compound, preferably with the diisocyanate, in a ratio of 1:>2, the excess of polyfunctional compound being, for example, just large enough to avoid chain extension of the basic polymer, although only small quantities of unreacted polyfunctional compound are present in the reactive component. A procedure such as this can be of advantage in particular where a diisocyanate is used as the polyfunctional compound. A polymer terminated by two functional groups which can be polymerized by reaction with a compound containing at least on acidic hydrogen atom is obtained in this way.

In order to obtain a polymer suitable for use as a reactive component from a polymer such as this, the polymer is preferably reacted with a compound which contains both a functional group polymerizable by exposure to UV light or to electron beams and a functional group suitable for reaction with the terminal functional group of the polymer. Hydroxyalkyl acrylates or methacrylates, i.e. reaction products of acrylic acid or methacrylic acid with difunctional alcohols, are particularly suitable for this purpose. Hydroxyacrylates or methacrylates particularly suitable for use in accordance with the present invention are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

Polymers suitable for use as the reactive component may also be obtained, for example, in several steps. In a first step, the OH-terminated basic polymer is reacted with a compound which contains both a functional group polymerizable by exposure to UV light or to electron beams and a functional group capable of reacting with the terminal OH group of the basic polymer. One example of such a compound is styrene isocyanate. Other such compounds may be obtained, for example, by reacting a substantially equimolar quantity of a hydroxyalkyl acrylate or methacrylate with a diisocyanate. After reaction of a substantially equimolar quantity of the basic polymer (optionally adapted by chain extension to the molecular weight required for use in component A) with such a compound in a second step, a polymer terminated both by an OH group and by a functional group polymerizable by exposure to UV light or to electron beams is formed. If this polymer is reacted, for example, with a diisocyanate, a polymer suitable for use as the reactive component is obtained.

The two steps mentioned above may also be combined by reacting a basic polymer, a diisocyanate (or optionally another polyfunctional compound in the context of the foregoing observations) and a compound containing both a functional group polymerizable by exposure to UV light or to electron beams and a functional group capable of reacting with the terminal OH group of the basic polymer with one another in a suitable molar ratio so that the percentages of the two types of functional groups in the polymer mixture obtainable by such a reaction vary between >0% and <100% (based on functional groups). Favorable results can be obtained, for example, if around 1 to around 50%, preferably around 5 to around 30% and, more preferably, around 8 to around 15% of the functional groups present as terminal groups in the polymer are functional groups polymerizable by exposure to UV light or to electron beams.

Typical NCO contents for polymers suitable for use as the reactive component are about 2.5% by weight to about 7% by weight and, more particularly, about 3.5% by weight to about 5% by weight.

The reactive component used in accordance with the present invention may consist of only one of the described polymers, although it may advantageously represent a mixture of two or more of the polymers mentioned. For example, it is of advantage to use a mixture of one or more polyester polyols and one or more polyether polyols as the basic polymer. The various basic polymers may differ, for example, in their molecular weights ($M_n$) or in their chemical compositions or in both.

In one preferred embodiment of the invention, around 20 to around 40% by weight of polyester polyols and around 20 to around 60% by weight of polyether polyols, based on component A as a whole, are used as the basic polymers for producing the reactive component. In another preferred embodiment, at least two different polyether polyols, more particularly a mixture of a polyether polyol with a molecular weight of about 800 to about 1,500 and a polyether polyol with a molecular weight of about 300 to about 700, are used in addition to a polyester polyol as the basic polymer.

To produce the reactive component, the individual basic polymers may be provided with functional groups and optionally chain-extended, as described above, so that they are directly suitable for use as the reactive component. In one preferred embodiment of the invention, however, a mixture of OH-functional basic polymers is initially reacted with a suitable quantity of polyisocyanates and then—in a suitable molar ratio—with compounds which contain both a functional group polymerizable by exposure to UV light or to electron beams and a functional group capable of reacting with the terminal OH group of the basic polymer.

In another embodiment, at least one compound with a molecular weight of about 100 to about 8,000 which contains at least two functional groups polymerizable by exposure to UV light or to electron beams may also be used as the reactive component.

Accordingly, acrylates or methacrylates with a functionality of two or more are particularly suitable as the reactive component. Acrylates or methacrylates such as these include, for example, esters of acrylic acid or methacrylic acid with aromatic, aliphatic or cycloaliphatic polyols or acrylate esters of polyether alcohols.

Various polyols may be used as the polyols for producing suitable reactive acrylate or methacrylate esters of the type in question. Examples of such polyols are aliphatic polyols containing 2 to 4 OH groups per molecule and 2 to about 40 carbon atoms. The OH groups may be both primary and secondary OH groups. Suitable aliphatic polyols include, for example, ethylene glycol, propane-1,2-diol, propane-1,3-diol, butane-1,4-diol, butane-1,3-diol, butane-2,3-diol, butene-1,4-diol, butine-1,4-diol, pentane-1,5-diol and the isomeric pentanediols, pentenediols or pentinediols or mixtures of two or more thereof, hexane-1,6-diol and the isomeric hexanediols, hexenediols or hexinediols or mixtures of two or more thereof, heptane-1,7-diol and the isomeric heptane, heptene or heptinediols, octane-1,8-diol and the isomeric octane, octene or octinediols and higher homologs or isomers of the compounds mentioned, which may be obtained in known manner by step-by-step extension of the hydrocarbon chain by one $CH_2$ group at a time or by introducing branches into the carbon chain, or mixtures of two or more thereof.

Other suitable polyols are higher alcohols, such as for example glycerol, trimethylol propane, pentaerythritol or sugar alcohols, such as sorbitol or glucose, and oligomeric ethers of the substances mentioned either as such or in the form of mixtures of two or more of the compounds mentioned with one another, for example polyglycerol with a degree of polymerization of about 2 to about 4. In the case of the higher alcohols, one or more OH groups may be esterified with monobasic carboxylic acids containing 1 to about 20 carbon atoms, with the proviso that, on average, at least two OH groups remain intact. The higher alcohols mentioned may be used in pure form or, where possible, in the form of the technical mixtures obtainable in the course of their synthesis.

In addition, reaction products of low molecular weight, polyfunctional alcohols with alkylene oxides, so-called polyether polyols, may be used as polyol component for the production of the acrylate or methacrylate esters. Polyether polyols which are intended to be used for the production of polyesters suitable as basic polymers are preferably obtained by reaction of polyols with alkylene oxides. The alkylene oxides preferably contain 2 to about 4 carbon atoms. Suitable polyether polyols are, for example, the reaction products of ethylene glycol, propylene glycol, the isomeric butanediols or hexanediols, as mentioned above, or mixtures of two or more thereof with ethylene oxide, propylene oxide or butylene oxide or mixtures of two or more thereof. Products of the reaction of polyfunctional alcohols, such as glycerol, trimethylol ethane or trimethylol propane, pentaerythritol or sugar alcohols, or mixtures of two or more thereof with the alkylene oxides mentioned to form polyether polyols are also suitable. The polyether polyols with a molecular weight ($M_n$) of about 100 to about 2,000, preferably in the range from about 150 to about 1,500 and more preferably in the range from about 150 to about 800 obtainable from the reactions mentioned are particularly suitable.

Acrylate esters of aliphatic diols containing 2 to about 40 carbon atoms include, for example, neopentyl glycol di(meth)acrylate, 1,6-hexanediol di(meth)acrylate, trimethylol propane tri(meth)acrylate, pentaerythritol tetra (meth)acrylate and (meth)acrylate esters of sorbitol and other sugar alcohols. These (meth)acrylate esters of aliphatic or cycloaliphatic diols may be modified with an aliphatic ester or an alkylene oxide. The acrylates modified by an aliphatic ester comprise, for example, neopentyl glycol hydroxypivalate di(meth)acrylate, caprolactone-modified neopentyl glycol hydroxypivalate di(meth)acrylates and the like. The alkylene oxide-modified acrylate compounds include, for example, ethylene oxide-modified neopentyl glycol di(meth)acrylates, propylene oxide-modified neopentyl glycol di(meth)acrylates, ethylene oxide-modified 1,6-hexanediol di(meth)acrylates or propylene oxide-modified hexane-1,6-diol di(meth)acrylates or mixtures of two or more thereof.

Acrylate monomers based on polyether polyols comprise, for example, neopentyl glycol-modified trimethylol propane di(meth)acrylates, polyethylene glycol di(meth)acrylates, polypropylene glycol di(meth)acrylates and the like. Trifunctional and higher acrylate monomers comprise, for example, trimethylol propane tri(meth)acrylate, pentaerythritol tri(meth)acrylate, dipentaerythritol tetra(meth)acrylate, dipentaerythritol penta(meth)acrylate, dipentaerythritol hexa(meth)acrylate, caprolactone-modified dipentaerythritol hexa(meth)acrylate, pentaerythritol tetra(meth)acrylate, tris[(meth)acryloxyethyl]-isocyanurate, caprolactone-modified tris[(meth)acryloxyethyl]-isocyanurates or trimethylol propane tetra(meth)acrylate or mixtures of two or more thereof.

Of the above-mentioned difunctional, trifunctional or higher acrylate monomers which may be used in accordance with the invention as the reactive component, tripropylene glycol diacrylate, neopentyl glycol propoxylate di(meth) acrylate, trimethylol propane tri(meth)acrylate and pentaerythritol triacrylate are preferred.

The adhesives A according to the invention contain the reactive component in a quantity of about 10 to about 99.9% by weight and preferably in a quantity of about 15 to about 99% by weight.

The molar ratios between the basic polymer and the compound containing both a functional group polymerizable by exposure to UV light or to electron beams and a functional group capable of reacting with the terminal functional group of the polymer may vary within wide limits during the reaction. In general, a larger number of functional groups polymerizable by exposure to UV light or to electron beams in the reactive component leads to an adhesive bond of relatively high strength whereas a larger number of functional groups capable of reacting with a compound containing at least one acidic hydrogen atom leads to greater ultimate strength.

If, for example, the basic polymer is reacted with the compound containing both a functional group polymerizable by exposure to UV light or to electron beams and a functional group capable of reacting with the terminal functional group of the polymer in a molar ratio of about 1:1, each polymer molecule in the resulting polymer mixture contains on average both a functional group polymerizable by exposure to UV light or to electron beams and a functional group capable of reacting with a compound containing at least one acidic hydrogen atom. The percentages of the two types of functional groups in the polymer mixture obtainable by such a reaction can be varied accordingly between greater than 0 and greater than 100% (based on functional groups in the context of the present invention). Good results can be obtained, for example, if about 100 to about 10%, preferably about 1 to about 50% and, more preferably, about 8 to about 15% of the functional groups present as terminal groups in the polymer are functional groups polymerizable by exposure to UV light or to electron beams.

Where the molecular weight is increased by cationic reaction, the compounds in question are styrenes, vinyl ethers and epoxides, whether low molecular weight compounds or correspondingly modified macromolecular compounds, more particularly compounds containing epoxy groups.

An "epoxy group" in the context of the present invention is a functional group comprising an oxirane ring. Epoxy groups such as these can be polymerized in known manner by cationically initiated polymerization. The adhesive used in accordance with the present invention may contain an aliphatic compound containing at least one epoxy group as sole constituent, although a mixture of two or more compounds containing at least one epoxy group may also be used. The epoxy compound may also be used together with radically reacting compounds containing the olefinically unsaturated double bonds described above, more especially with the acrylate monomers and/or acrylate-modified polymers, in some cases even with the isocyanate compounds.

To produce polymers, it is sufficient if the compound containing at least one epoxy group present as a constituent of the adhesive contains only one epoxy group. However, to obtain a higher degree of crosslinking in the adhesive film, it may be desirable at least partly to use one or more compounds containing more than one epoxy group in the molecule as a constituent of the adhesive A. The compounds used advantageously contain 1 to about 4 epoxy groups per molecule. In one particularly preferred embodiment, the average epoxy group content of the adhesive A as a whole is about 1 to about 2.5 and, more particularly, about 1.5 to about 2.0.

In principle, a low molecular weight epoxide may be used as the compound containing at least one epoxy group, although relatively high molecular weight epoxides or mixtures of low molecular weight and relatively high molecular weight epoxides may also be used.

In the context of the invention, "low molecular weight compounds" are compounds containing at least one epoxy group which have a molecular weight of not more than about 400. Accordingly, compounds containing at least one epoxy group with a molecular weight of more than 400 are referred to as "relatively high molecular weight compounds" in the present specification.

Relatively high molecular weight compounds containing at least one epoxy group may contain the epoxy group, for example, at the end of a polymer chain although the epoxy group may also be located within the polymer chain or may be laterally attached to the polymer chain. In the case of compounds containing more than one epoxy group, the corresponding relatively high molecular weight compound may also contain epoxy groups in two or more of the described configurations in relation to the main polymer chain. Thus, a compound containing more than one epoxy group, for example, may have one terminal epoxy group and one lateral epoxy group or one epoxy group within the polymer backbone and one lateral epoxy group.

Compounds containing at least one epoxy group suitable for use as adhesive A in accordance with the present invention include, for example, the cycloaliphatic epoxides. Examples of cycloaliphatic epoxides are bis-(3,4-epoxycyclohexylmethyl)-oxalate, bis-(3,4-epoxycyclohexylmethyl)-adipate, bis-(3,4-epoxy-6-methylcyclohexylmethyl)-adipate and/or bis-(3,4-epoxycyclohexylmethyl)-pimelate. Also suitable are 3,4-epoxycyclohexylmethyl-3,4-epoxycyclohexane carboxylates, for example 3,4-epoxycyclohexylmethyl-3,4-epoxycyclohexane carboxylic acid, 3,4-epoxy-1-methylcyclohexylmethyl-3,4-epoxy-1-methyl cyclohexane carboxylic acid, 6-methyl-3,4-epoxycyclomethyl-6-methyl-3,4-epoxycyclohexane carboxylic acid, 3,4-epoxy-2-methylcyclohexylmethyl-3,4-epoxy-2-methyl cyclohexane carboxylic acid, 3,4-epoxy-5-methylcyclohexylmethyl-3,4-epoxy-5-methylcyclohexane carboxylic acid and the like.

Other suitable epoxides which may be used for the purposes of the present invention are the glycidyl ethers obtainable, for example, from polyhydric phenols, for example diglycidyl ethers of 2,2'-bis-(2,3-epoxypropoxyphenol)-propane.

Commercially available compounds containing at least one epoxy group may also be used with advantage. Examples of such compounds are octadecylene oxide, epichlorohydrin, styrene oxide, vinyl cyclohexene oxide, glycidol, glycidyl methacrylate, diglycidyl ethers of bisphenol A (for example EPON 818, EPON 1004 and EPON 1010, products of Shell Chemical Co.; DER-331, DER-332 and DER-334, products of Dow Chemical Co.), vinyl cyclohexene dioxide (for example ERL-4206, a product of Union Carbide Corp.), 3,4-epoxycyclohexylmethyl-3,4-epoxycyclohexene carboxylate (for example ERL-4221, a product of Union Carbide Corp.), 3,4-epoxy-6-methylcyclohexylmethyl-3,4-epoxy-6-methylcyclohexene carboxylate (for example ERL-4201, a product of Union Carbide Corp.), bis-(3,4-epoxy-6-methylcyclohexylmethyl)-adipate (for example ERL-4289, a product of Union Carbide Corp.), bis-(2,3-epoxycyclopentyl)-ether (for example ERL-0400, a product of Union Carbide Corp.), aliphatic, propylene glycol-modified epoxy resin (for example ERL-4050 or ERL-4052, products of Union Carbide Corp.), dipentene dioxide (for example ERL-4269, a product of Union Carbide Corp.), epoxidized polybutadiene (for example OXIRON 2001, a product of FMC Corp.), epoxyfunctional silicone resin, flame-retardant epoxy resins (for example DER-80, a product of Dow Chemical Co.), butane-1,4-diol diglycidyl ether of phenol/formaldehyde novolak (for example DEN-431 or DEN-438, products of Dow Chemical Co.) and resorcinol diglycidyl ether (for example KOPOXITE, a product of Koppers Co., Inc.).

Other suitable compounds containing at least one epoxy group are epoxyfunctional polymers obtainable, for example, by polymerization of epoxyfunctional, ethylenically unsaturated epoxy compounds. Examples of such epoxyfunctional, ethylenically unsaturated compounds are the acrylates of glycidol, for example glycidyl acrylate or glycidyl methacrylate. These compounds are advantageously copolymerized with at least one other ethylenically unsaturated compound with no epoxy group. Polyurethanes containing epoxy groups, for example, are also suitable. Such polyurethanes may obtained, for example, by reacting OH-containing polyesters or polyethers with polyfunctional isocyanates, the stoichiometric ratio of isocyanate groups to OH groups being selected so that the corresponding polyurethane contains at least one free isocyanate group which is subsequently reacted, for example, with 1-hydroxy-2,3-epoxypropane or another suitable epoxide.

The adhesive A generally contains up to 100% by weight and preferably up to about 30% by weight of a compound containing only one epoxy group. The percentage of compounds containing two or more epoxy groups is up to about 100% by weight and preferably about 10 to about 40% by weight, the percentage of trifunctional and higher epoxides in the adhesive A being up to about 10% by weight.

Besides the aliphatic epoxy compound, the adhesive A contains a compound containing at least two OH groups with a molecular weight of less than 400. The percentage of trifunctional compound, i.e. a compound containing three OH groups, is from about 1 to about 10% by weight, based on the adhesive as a whole. If the adhesive A also contains NCO groups, it is advisable either to use no polyols or only to add them immediately before use.

Suitable OH-containing compounds are, for example, higher alcohols, such as glycerol, trimethylol propane, pentaerythritol and sugar alcohols, and oligomeric ethers of the individual compounds mentioned or oligomeric ethers of a mixture of two or more of the compounds mentioned with one another. The reaction products of low molecular weight polyfunctional alcohols with alkylene oxides containing up to 4 carbon atoms may also be used as polyol component for the production of the polyesters. Suitable reaction products are, for example, those of polyfunctional alcohols, such as glycerol, trimethylol ethane and/or trimethylol propane, pentaerythritol or sugar alcohols, with the alkylene oxides mentioned to form oligoether polyols with a molecular weight of not more than about 400.

The adhesive A according to the invention may contain as polyol a compound containing at least two OH groups with a molecular weight of at least 400 or a mixture of two or more such compounds. The compounds used as polyols preferably have a molecular weight of more than about 400 to about 10,000 and, more preferably, in the range from more than about 400 to about 2,000.

Suitable polyols are, for example, polyester polyols, polyether polyols, polyurethane polyols, polycarbonate polyols, polyvinylacetal polyols, polyacrylate polyols, polymethacrylate polyols or copolyols of suitable acrylates and methacrylates or mixtures of two or more of the polyols mentioned. A particularly preferred embodiment of the invention is characterized by the use of polyester polyols, polyether polyols or polyurethane polyols.

Preferred polyester polyols are produced by reaction of low molecular weight alcohols, more particularly ethylene glycol, diethylene glycol, neopentyl glycol, hexanediol, butanediol, propylene glycol, glycerol or trimethylol propane, by polycondensation with a polycarboxylic acid or a mixture of such acids. For example, difunctional and/or trifunctional alcohols may be condensed with dicarboxylic acids and/or tricarboxylic acids or reactive derivatives thereof to form polyesters. Suitable dicarboxylic acids are, for example, succinic acid and higher homologs containing up to 16 carbon atoms, unsaturated carboxylic acids, such as maleic acid or fumaric acid, and aromatic dicarboxylic acids, more especially the isomeric phthalic acids, such as phthalic acid, isophthalic acid or terephthalic acid. Suitable tricarboxylic acids are, for example, citric acid or trimellitic acid. Also suitable are aliphatic polycarboxylic acids, such as adipic acid, glutamic acid, pimelic acid, aromatic acids, such as naphthalene dicarboxylic acid, cycloalkyl acids, such as cyclohexane dicarboxylic acid, or acids containing hetero atoms, such as S or N, for example diglycolic acid, ethylether-2,2-dicarboxylic acid or thiodiglycolic acid.

Other suitable polyols for the production of the polyesters are aliphatic alcohols containing two to four OH groups per molecule. The OH groups are preferably primary OH groups although they may also be secondary OH groups. Suitable aliphatic alcohols are, for example, ethylene glycol, propylene glycol, butane-1,4-diol, pentane-1,5-diol, hexane-1,6-diol, heptane-1,7-diol, octane-1,8-diol and higher homologs and isomers thereof which may be obtained in known manner by step-by-step extension of the hydrocarbon chain by one $CH_2$ group at a time or by introducing branches into the carbon chain. Other suitable polyols are higher alcohols, for example glycerol, trimethylol propane, pentaerythritol and oligomeric ethers of the substances mentioned either as such or in the form of mixtures of two or more of the ethers mentioned with one another.

The reaction products of low molecular weight polyfunctional alcohols with alkylene oxides containing up to 4 carbon atoms may also be used as polyol component for producing the polyesters. Suitable reaction products are, for example, those of ethylene glycol, propylene glycol, the isomeric butanediols or hexanediols with ethylene oxide, propylene oxide and/or butylene oxide. Products of the reaction of polyfunctional alcohols, such as glycerol, trimethylol ethane and/or trimethylol propane, pentaerythritol or sugar alcohols, with the alkylene oxides mentioned to form polyether polyols are also suitable. The reaction products of low molecular weight polyfunctional alcohols with alkylene oxides containing up to 4 carbon atoms may also be used as polyol component for the production of the polyesters. Suitable reaction products are, for example, those of ethylene glycol, propylene glycol, the isomeric butanediols or hexanediols with ethylene oxide, propylene oxide and/or butylene oxide. Products of the reaction of polyfunctional alcohols, such as glycerol, trimethylol ethane and/or trimethylol propane, pentaerythritol or sugar alcohols with the alkylene oxides mentioned to form polyether polyols are also suitable. Particularly suitable polyols for the production of the polyesters are polyether polyols with a molecular weight of about 100 to 5,000 and preferably in the range from about 200 to about 3,000. Propylene glycol with a molecular weight of about 300 to about 2,500 is most particularly preferred for the purposes of the present invention. The polyether polyols obtained, for example, by polymerization of tetrahydrofuran are also suitable.

A group of polymers particularly preferred as polyols for the purposes of the present invention are the polyurethane polyols. Polyurethane polyols in the context of the present invention are compounds which can be obtained by polyaddition from difunctional and/or higher alcohols and polyisocyanates. The polyols used for producing the polyurethanes are typically polyesters and/or polyethers containing at least two hydroxy groups with a molecular weight of about 300 to 10,000 and preferably in the range from about 800 to about 5,000. Suitable polyesters for producing the polyurethanes suitable for use in accordance with the present invention are any OH-terminated polyesters which can be reacted with at least one difunctional isocyanate in a chain-extending reaction. These include, for example, the polyesters mentioned above.

Other dihydroxy compounds which may be used for the preparation of the polyesters suitable as polyol component for the production of the polyurethanes are, for example, butane-1,3-diol, butane-1,4-diol, butane-2,3-diol, 2,2-diethylpropane-1,3-diol, 2-methyl-2-propylpropane-1,3-diol, isomeric octanediols, ethylenically unsaturated difunctional compounds, such as heptenediol, octenediol and difunctional compounds containing hetero atoms (N or S), for example diethylene glycol, triethylene glycol, thioethylene glycol, diethanolamine or N-methyl diethanolamine or mixtures of two or more thereof.

To produce the polyurethanes, the diols are generally reacted with corresponding, at least difunctional isocyanates. The isocyanates used in accordance with the present invention may be aliphatic or aromatic and contain about 4 to about 40 carbon atoms. Examples of suitable isocyanates are hexamethylene diisocyanate (HDI), 1,8-octane diisocyanate, 1,10-decane diisocyanate, the diisocyanates obtainable, for example, from the dimerization of fatty acids and corresponding subsequent functionalization, phenylene-1,4-diisocyanate, tetramethyl xylylene diisocyanate (TMXDI), 2,4- and 2,6-toluene diisocyanate and mixtures thereof, 1,5-naphthylene diisocyanate, 2,4'- or 4,4'-diphenyl methane diisocyanate (MDI) and mixtures thereof, isophorone diisocyanate (IPDI), cyclobutane-1,3-diisocyanate, cyclohexane-1,3- and -1,4-diisocyanate, 2,4- and 2,6-hexahydrotoluene diisocyanate, hexahydro-1,3- or -1,4-phenylene diisocyanate, 2,2'-diphenyl methane diisocyanate or 4,4'-diphenyl methane diisocyanate or mixtures of two or more of the diisocyanates mentioned. The trifunctional or higher polyisocyanates obtainable, for example, by oligomerization of diisocyanates may also be used in accordance with the invention as the isocyanate required for the production of the polyurethane present in adhesive A. Examples of such trifunctional and higher polyisocyanates are the triisocyanurates of HDI or IPDI or mixed triisocyanurates thereof.

In general, the average molecular weight of the polymer used as polyol should not exceed a value of 400. Since polymers generally have a statistical molecular weight distribution, depending on the particular synthesis method used, the expression "average molecular weight" refers to the number average ($M_n$) molecular weight of the polymers present in adhesive A. This means that individual polymeric molecules with a molecular below the value of 400 mentioned may also be present.

In addition to the epoxy compounds mentioned, the adhesive A to be used in accordance with the invention may also contain one or more other components containing a cationically polymerizable functional group which is not an epoxy group. Examples of such components are olefins, vinyl ethers, vinyl arenes, more particularly styrene, and heterocyclic compounds, such as ethers, thioethers, esters or acetals. The vinyl ethers formally obtainable, for example, from the etherification of alcohols, preferably polyols, and vinyl ethers (in fact acetylene is generally used as starting material in the industrial production of the vinyl ethers), and vinyl styrene are preferably used for the purposes of the present invention.

The use of vinyl ethers is particularly preferred for the purposes of the invention. Suitable low molecular weight vinyl ethers with molecular weights of up to about 400 are, for example, monofunctional or difunctional vinyl ethers. Examples of monofunctional or difunctional vinyl ethers are hydroxybutyl vinyl ether, triethylene glycol divinyl ether, cyclohexane dimethanol divinyl ether, propylene carbonate propenyl ether, dodecyl vinyl ether, cyclohexane dimethanol monovinyl ether, cyclohexyl vinyl ether, diethylene glycol divinyl ether, 2-ethylhexyl vinyl ether, dipropylene glycol divinyl ether, tripropylene glycol divinyl ether, hexanediol divinyl ether, octadecyl vinyl ether or butanediol divinyl ether which represents a preferred compound. Divinyl ethers of higher alcohols may also be used. Examples of such divinyl ethers are glycerol monovinyl ether, glycerol divinyl ether, glycerol trivinyl ether, trimethylol propane mono-, di- or trivinyl ether, pentaerythritol mono-, di-, tri- or tetravinyl ether or vinyl ethers of alcohols containing more than four OH groups, for example vinyl ethers of sugar alcohols. The compounds mentioned may be used both individually and in the form of a mixture of two or more of the vinyl ethers mentioned.

Where a relatively high molecular weight compound with molecular weights of about 400 to about 10,000 is used as the component which additionally reacts cationically, the compound in question is preferably a polymer which contains a cationically polymerizable group which is not an epoxy group as a terminal group or, optionally, laterally to the main polymer chain. Compounds such as these, which are preferably used individually or in the form of a mixture in the adhesive to be used in accordance with the invention, may be obtained, for example, from relatively high molecular weight polyol components of the type described in the foregoing. For example, a vinyl styrene-terminated polymer may be prepared by reacting an OH-terminated polymer with 4-styrene isocyanate. A polyester polyol or polyether polyol or a polyurethane is preferably used as the OH-terminated polymer. It is also possible to prepare a wide variety of polymers containing vinyl ether groups. To this end, an OH-containing polymer, for example, is reacted with an at least twofold excess of diisocyanates (based on OH groups). The resulting polymer, which contains free NCO groups, is then reacted with hydroxyvinyl ethers. Polymers containing vinyl ethers may also be prepared by initially reacting an OH-containing vinyl ether with an equimolar quantity of a diisocyanate and subsequently reacting the product of this reaction with an OH-terminated polymer. Preferred OH-containing vinyl ethers for the purposes of the present invention are hydroxybutyl vinyl ether, hydroxyhexyl vinyl ether and cyclohexane dimethanol monovinyl ether.

The adhesive A to be used in accordance with the invention contains the component which reacts cationically without having an epoxy group in a quantity of up to 20% by weight, preferably in a quantity of 0.1 to about 10% by weight and more preferably in a quantity of about 1 to about 8% by weight based on the adhesive A as a whole.

The adhesive A to be used in accordance with the invention contains as photoinitiator a photoinitiator or a mixture of two or more photoinitiators which are capable of initiating the polymerization of the epoxy groups and also the acrylate groups under the effect of radiation. Particularly suitable photoinitiators are those which produce Lewis acids or Brönsted acids under the effect of electromagnetic radiation, more particularly under the effect of light.

According to the invention, complex onium compounds are preferably used as the photoinitiators which produce Lewis acids and/or Brönsted acids under the effect of light. In principle, any photosensitive aromatic sulfonium or iodonium salts are suitable for the light-induced initiation of the polymerization process. Particularly suitable photoinitiators of this type of are the trisaryl sulfonium hexafluoroantimonates, the trisaryl sulfonium hexafluorophosphates present, for example, in the commercial products of Cyracure®UVI-6974 and UVI-6990 (products of UCC, Danbury, UK) and bis-(4,4'-dimethylbenzyl)-iodonium tetra-(pentafluorophenyl)-borate (UV CATA 200, a product of Rhône-Poulenc, Saint-Fons, France).

The photoinitiator used in accordance with the present invention is capable of initiating a radical or cationic polymerization after exposure to light with a wavelength of about 100 to about 600 nm. In one preferred embodiment, the polymerization reaction is initiated by exposure to light with a wavelength of about 150 to about 500 nm, for example in the range from about 200 to 480 nm.

Compounds and mixtures of compounds which are capable of initiating the radical polymerization of olefinically unsaturated double bonds on exposure to light with a wavelength of about 260 to about 480 nm are used as a photoinitiator, more especially for the radical reaction. In principle, any commercially available photoinitiators which are compatible with the adhesive according to the invention, i.e. which form at least substantially homogeneous mixtures, may be used for the purposes of the present invention.

Commercially available photoinitiators such as these are, for example, any Norrish-type I fragmenting substances, for example benzophenone, camphor quinone, Quantacure (a product of International Bio-Synthetics), Kayacure MBP (a product of Nippon Kayaku), Esacure BO (a product of Fratelli Lamberti), Trigonal 14 (a product of Akzo), photoinitiators of the Irgacure®, Darocure® or Speedcure® series (products of Ciba Geigy), Darocure® 1173 and/or Fi-4 (made by the Eastman Company). Of these, Irgacure® 651, Irgacure® 369, Irgacure® 184, Irgacure® 907, Irgacure® 1850, Irgacure® 1173 (Darocure® 1173), Irgacure® 1116, Speedcure® EDB, Speedcure® ITX, Irgacure® 784 or Irgacure® 2959 or mixtures of two or more thereof are particularly suitable.

Photoinitiators from the following group are preferred: benzoin and benzoin derivatives, phenyl hydroxyalkanone types and thioxanthone types.

A photoinitiator with a molecular weight of more than about 200 is at least partly used in one preferred embodiment of the invention. Commercially available photoinitiators which meet this requirement are, for example, Irgacure® 651, Irgacure® 369, Irgacure® 907, Irgacure® 784, Speedcure® EDB and Speedcure® ITX.

However, photoinitiators which meet the above-stated requirement in regard to their molecular weight can also be obtained by reacting a low molecular weight photoinitiator containing an isocyanate-reactive functional group, for example an amino group or an OH group, with a high molecular weight compound containing at least one isocyanate group (polymer-bound photoinitiators). Compounds containing more than one photoinitiator molecule, for example two, three or more photoinitiator molecules, are preferably used as the photoinitiator. Compounds such as these can be obtained, for example, by reacting a polyfunctional alcohol containing two or more OH groups with suitable diisocyanates or triisocyanates and photo-initiators containing a suitable isocyanate-reactive functional group.

Suitable polyfunctional alcohols are any of the polyfunctional alcohols mentioned above, but especially neopentyl glycol, glycerol, trimethylol propane, pentaerythritol and alkoxylation products thereof with $C_{2-4}$ alkylene oxides. Other suitable and, according to the invention, particularly preferred polyfunctional alcohols are the reaction products of trihydric alcohols with caprolactone, for example the reaction product of trimethylol propane with caprolactone (Capa 305, a product of Interox, Cheshire, UK; molecular weight ($M_n$)=540).

Another preferred embodiment of the present invention is characterized by the use of a photoinitiator obtainable by reacting an at least trihydric alcohol with caprolactone to form a polycaprolactone containing at least three OH groups with a molecular weight of about 300 to about 900 and then linking the polycaprolactone to 1-[4-(2-hydroxyethoxy)-phenyl]-2-hydroxy-2-methylpropan-1-one by means of a compound containing at least two isocyanate groups.

Suitable compounds containing at least two isocyanate groups, more particularly suitable diisocyanates, for reaction with the polyols mentioned are, for example, any of the diisocyanates mentioned in the present specification. However, the 2,4-isomer and the 2,6-isomer of toluene diisocyanate are particularly preferred, the isomers being used either in their pure form or in the form of a mixture.

Suitable photoinitiators for producing the polymer-bound photoinitiators are any photoinitiators which contain an isocyanate-reactive functional group. 1-[4-(2-hydroxyethoxy)-phenyl]-2-hydroxy-2-methylpropan-1-one (Irgacure® 2959), which has one primary OH group, is particularly preferred for the purposes of the present invention.

The photoinitiators may also be prepared by using a small quantity of photoinitiator molecules reactive to isocyanate groups in the production of the adhesive A. In this way, the photoinitiator is attached to a molecule of the adhesive A.

The photoinitiator may also be attached to a polymer chain of the adhesive A by adding the photoinitiator containing a corresponding functional group to the adhesive in monomeric form and then reacting it with a corresponding polymeric component of the adhesive A, for example during storage of the adhesive.

It is also possible to provide the photoinitiator with a functional group polymerizable by exposure to UV light or to electron beams, in which case the functional group polymerizable by exposure to UV light or to electron beams can be attached to the photoinitiator, for example by reaction of the photoinitiator with an unsaturated carboxylic acid. Suitable unsaturated carboxylic acids are, for example, acrylic acid and methacrylic acid. The reaction products of Irgacure® 2959 with acrylic acid or methacrylic acid are particularly suitable for the purposes of the invention.

Accordingly, a compound which contains both a photoinitiator and a functional group polymerizable by exposure to UV light or to electron beams may be used as the photoinitiator.

The adhesive A according to the invention contains the photoinitiator in a quantity of up to about 25% by weight, based on the adhesive A as a whole, the lower limit being at around 0.01% by weight. Based on the individual photoinitiator molecule itself (irrespective of whether it is covalently bonded to another compound), the percentage content in the adhesive should be at least about 0.01% by weight to about 10% by weight, preferably in the range from about 0.5 to about 5% by weight and more preferably in the range from about 1 to about 3% by weight, based on the adhesive A as a whole.

In addition, coinitiators or photosensitizers, for example acetophenone, benzophenone and fluorescin and derivatives thereof, may also be used.

In one preferred embodiment, the adhesive A according to the invention may contain at least one compound which has only one functional group polymerizable by exposure to UV light or to electron beams as a monofunctional reactive diluent. Compounds which are liquid at room temperature, more especially corresponding esters of acrylic or methacrylic acid, are particularly suitable for this purpose. Particularly suitable compounds are, for example, the acrylic or methacrylic acid esters of aromatic or aliphatic, linear or branched $C_{4-20}$ monoalcohols or of corresponding ether alcohols, for example n-butyl acrylate, 2-ethylhexyl acrylate, 3-methoxybutyl acrylate, 2-phenoxyethyl acrylate, benzyl acrylate or 2-methoxypropyl acrylate.

The monofunctional reactive diluents make up as much as about 50% by weight of the adhesive A, but preferably less, for example about 40% by weight, 30% by weight or about 20% by weight. Smaller quantities may also be used, so that the adhesive A may even contain only 10% by weight or between about 0.5 and about 8% by weight of monofunctional reactive diluent.

After an initial curing stage, for example by exposure to electron beams or UV rays (in conjunction with a corresponding photoinitiator), the adhesive A may be cured to the required ultimate strength by the influence of atmospheric moisture. However, if the adhesive is required to develop a certain ultimate strength at an early stage, i.e. if a high curing rate is required, for example to enable the bonded materials to further processed as quickly as possible, the curing rate achieved by atmospheric moisture may be too slow. In cases such as these, a hardener may be added to the adhesive before processing.

Accordingly, the present invention also relates to an adhesive A which contains a compound containing at least two acidic hydrogen atoms as hardener.

In one preferred embodiment, the hardener is a compound containing at least two functional groups each with at least one acidic hydrogen atom or a mixture of two or more such compounds which are capable of reacting with the corresponding functional groups of the adhesive A. In the context of the invention, the corresponding functional groups of the adhesive A are understood to be any of the functional groups present in the adhesive A which are not polymerizable by irradiation under the conditions according to the invention, more particularly isocyanate groups.

The compounds suitable for use as hardeners preferably have a molecular weight of up to 2,500. Suitable functional groups with at least one acidic hydrogen atom which are reactive to the corresponding functional groups of the adhesive A are, in particular, primary or secondary amino groups, mercapto groups or OH groups. The compounds suitable for use as hardeners may contain amino groups, mercapto groups or OH groups either exclusively or in admixture with one another.

The compounds suitable for use as hardeners generally have a functionality of at least about two. The hardener preferably contains a certain percentage of compounds of higher functionality, for example with a functionality of three, four or more. The total (average) functionality of the hardener is, for example, about 2 (for example where only difunctional compounds are used as the hardener) or more, for example about 2.1, 2.2, 2.5, 2.7 or 3. The hardener may optionally have an even higher functionality, for example of about four or more.

The hardener preferably contains a polyol bearing at least two OH groups. Any of the polyols mentioned in the present specification are suitable for use as the hardener providing they satisfy the limiting criterion of the upper molecular weight limit.

The hardener is generally used in such a quantity that the ratio of the functional groups of adhesive A reactive to the hardener to groups of the hardener reactive to corresponding functional groups of the adhesive A is about 5:1 to about 1:1 and, more particularly, about 2:1 to about 1:1.

A compound containing at least two OH groups is preferably present as the hardener in the adhesive according to the invention.

The adhesive A may optionally contain additives which may make up as much as about 49% by weight of the adhesive as a whole. Additives which may be used in accordance with the present invention include, for example, plasticizers, stabilizers, antioxidants, dyes or fillers.

The plasticizers used are, for example, plasticizers based on phthalic acid, more especially dialkyl phthalates, preferred plasticizers being phthalic acid esters which have been esterified with a linear alkanol containing about 6 to about 12 carbon atoms. Dioctyl phthalate is particularly preferred. Other suitable plasticizers are benzoate plasticizers, for example sucrose benzoate, diethylene glycol dibenzoate and/or diethylene glycol benzoate, in which around 50 to around 95% of all the hydroxyl groups have been esterified, phosphate plasticizers, for example t-butyl phenyl diphenyl phosphate, polyethylene glycols and derivatives thereof, for example diphenyl ethers of poly(ethylene glycol), liquid resin derivatives, for example the methyl ester of hydrogenated resin, vegetable and animal oils, for example glycerol esters of fatty acids and polymerization products thereof.

The stabilizers or antioxidants suitable for use as additives in accordance with the present invention include phenols, sterically hindered phenols of high molecular weight ($M_n$), polyfunctional phenols, sulfur- and phosphorus-containing phenols or amines. Phenols suitable for use as additives in accordance with the invention are, for example, hydroquinone, hydroquinone methyl ether, 2,3-(di-tert.butyl)-hydroquinone, 1,3,5-trimethyl-2,4,6-tris-(3,5-di-tert.butyl-4-hydroxybenzyl)-benzene; pentaerythritol tetrakis-3-(3,5-ditert.butyl-4-hydroxyphenyl)-propionate; n-octadecyl-3,5-ditert.butyl-4-hydroxyphenyl)-propionate; 4,4-methylene-bis-(2,6-di-tert.butylphenol); 4,4-thiobis-(6-tert.butyl-o-cresol); 2,6-di-tert.butylphenol; 6-(4-hydroxyphenoxy)-2,4-bis-(n-octylthio)-1,3,5-triazine; di-n-octadecyl-3,5-di-tert.butyl-4-hydroxybenzyl phosphonates; 2-(n-octylthio)-ethyl-3,5-ditert.butyl-4-hydroxybenzoate; and sorbitol hexa[3-(3,5-ditert.butyl-4-hydroxyphenyl)-propionate]; and p-hydroxydiphenylamine or N,N'-diphenylenediamine or phenothiazine.

Other additives may be incorporated in the adhesive A in order to vary certain properties. These other additives include, for example, dyes, such as titanium dioxide, fillers, such as talcum, clay and the like. The adhesives according to the invention may optionally contain small quantities of thermoplastic polymers, for example ethylene/vinyl acetate (EVA), ethylene/acrylic acid, ethylene/methacrylate and ethylene/n-butyl acrylate copolymers which optionally impart additional flexibility, toughness and strength to the adhesive. Certain hydrophilic polymers may also be added, including for example polyvinyl alcohol, hydroxyethyl cellulose, hydroxypropyl cellulose, polyvinyl methyl ether, polyethylene oxide, polyvinyl pyrrolidone, polyethyl oxazolines or starch or cellulose esters, more particularly the acetates with a degree of substitution of less than 2.5. These hydrophilic polymers increase the wettability of the adhesives for example.

The adhesive B may be selected from any of the adhesives known for this purpose. It is preferably a hotmelt adhesive or a dispersion adhesive. If the adhesive B is a hotmelt adhesive, it contains a) a high-polymer basic resin of a polyamide, polyurethane and, more particularly, of a copolymer of ethylenically unsaturated monomers, preferably ethylene, with vinyl acetate, acrylic acid and/or methacrylic acid or $C_{1-4}$ esters of acrylic acid and/or methacrylic acid optionally in combination with b) resins based on natural or esterified, dimerized or polymerized colophony resins, polyterpene resins, phenol/styrene resins, aliphatic and/or aromatic hydrocarbon resins which increase adhesive strength and adhesion and/or c) with waxes and plasticizers.

A hotmelt adhesive based on ethylene/vinyl acetate copolymers is preferably used.

Alternatively, the adhesive B may also be a dispersion adhesive based, for example, on homopolymeric or copolymeric polyvinyl acetate dispersions, acrylate dispersions, polyvinylidene dispersions, butadiene/styrene dispersions, polyurethane dispersions, polychloroprene dispersions and rubber dispersions. In one preferred embodiment, an adhesive based on a homopolymeric plasticizer-modified polyvinyl acetate dispersion is used as this high-viscosity dispersion adhesive.

Of the adhesive A, a) 0 to 100% by weight may consist of the radicallly reacting component, b) 0 to 100% by weight of the cationically reacting component, c) 0 to 90% by weight of the component containing NCO groups, i.e. all three components may be used either individually (except for component c) or in combination, i.e. in combinations of a+b, a+c, b+c and a+b+c. All these possibilities may be used in the one-shot process or in the two-shot process together with the adhesive B.

The present invention also relates to a process for the perfect binding of brochures, books, catalogues, writing pads and similar printed articles by a one-step or multi-step perfect binding process, characterized in that the inner book is first coated with a low-viscosity crosslinkable adhesive A in a film thickness of less than 0.2 mm, the film is allowed to set and, finally, the adhesive B is optionally applied, the polymer film A additionally containing at least one photoinitiator.

The process according to the invention is carried out by exposing the adhesive A during or after its application to the sheet edge to electromagnetic radiation with wavelengths of <600 nm and preferably to UV radiation with wavelengths of about 400 nm to 250 nm or to X radiation, electron beam radiation or gamma radiation. The binding process is otherwise substantially unchanged.

The claimed adhesive system not only affords advantages in regard to the simple and safe binding of printed articles without significant modifications to machinery. The printed articles obtained are also less problematical when it comes to recycling. Hitherto, adhesives have been so finely size-reduced in the recycling of waste paper that they could not be removed even by sieves. These tacky, generally thermoplastic "stickies" often result in tearing of the still wet paper webs on the drying cylinder during the papermaking process. In the case of the printed articles produced in accordance with the invention, the adhesive can easily be removed by sieves because the adhesive film has a strength of more than 5 N/mm².

EXAMPLES

I. Adhesives

Adhesive A: a UV-initiatable, cationically curing, solventless epoxy adhesive based on a cycloaliphatic epoxy resin and a sulfonium salt as photoinitiator and polyols, namely a polyester triol and a polyurethane triol of MDI, polyether diol and polyester diol.

Adhesive B: a hotmelt adhesive based on EVA, namely 30% EVA, 40% natural resin ester and 30% microwax.

II. Procedure

Adhesive A was applied at 70° C. to unpinioned inner books (80 g/m² paper) in a layer thickness of 0.3 to 0.7 mm. Immediately afterwards, the film was exposed to a UV lamp for about 5 minutes and then heated at 70° C. for about 10 minutes (one-shot process). After storage for 24 h at room temperature, the books were subjected to a pull and flex test.

Other books were glued with adhesive B at an application temperature of 170° C. (two-shot process) and then tested.

III. Reuslts

1. Pull and Flex Values

|  | Pull value in N/cm | Flex value in WG |
|---|---|---|
| Adhesive A (24 h storage) | 11.1 | 1850 |
| Adhesive A + adhesive B | 14.8 | 2000 |

IV. Test Methods

1. Pull Test

The page of a fully opened book (180 deorees) selected for the test is guided r through the opening slot of a Martini pull tester, after which the book is centrally clamped using the clamps present. The page is then clamped tight in the clamping jaw provided. The apparatus is switched on and actuated via the "advance" key. The page is then pulled under an increasing load until itailseparateafrom the bond. The measured value is read off and related to the height of the page. The book is then removed and the apparatus is returned to its starting position via the "return" key.

Normally, 3 to 5 values per book—distributed over the total number of pages—are determined according to the thickness of the book. In this way, differences between the beginning, middle and end can readily be detected. If two or more paper qualities are used in one and the same book, the method is adapted accordingly.

| Ranking of the pull values: | |
|---|---|
| >10 N/cm | excellent |
| 8–10 N/cm | very good |
| 5–7 N/cm | good |
| 3–4 N/cm | satisfactory |
| <–2 N/cm | weak |

2. Flex Test

The book is opened at 240 degrees and fixed to the table using the spring clips of a flex tester. The test page must lie exactly over the edge of the table and must be clamped exactly vertically. In this way, adjacent pages are unable to support the page to be tested. Starting with a weight of 200 g per page, 500 turns are completed and recorded by a counter. After each flex cycle, the weight is increased by 200 g up to 2000 g/page. The last flex cycle is carried out under that weight. By definition, a flex value of 2000 WG is achieved. This test lasts 45 minutes and gives a total flex count of 500×10=5,000 with an applied weight increasing from 200 g to 2000 g.

The measured flex value is expressed in WG. This unit is made up of the flex cycles and the applied weight.

| Calculation: | |
|---|---|
| Applied weight read off | 1,600 g |
| Flex count read off | 326 W |

$$(1600 - 200) + \frac{326 \times 200}{500}$$

Normally, 3 to 5 values—distributed over the total number of pages—are determined according to the thickness of the book. In this way, differences between the beginning, middle and end can readily be detected. If two or more paper qualities are present in one and the book, the method is adapted accordingly.

This method allows fine differentiation between paper qualities, adhesives, processing conditions and binding processes.

| Ranking of the values: | |
|---|---|
| 1800–2000 WG | very good |
| 1400–1600 WG | good |
| 1000–1200 WG | satisfactory |

Values below 1000 WG may still be acceptable according to requirements, but must be regarded as critical.

3. Viscosity

Viscosity is measured in accordance with ASTM D 3236-73 using a Brookfield digital viscosimeter (Model RVT-DV II) at 20 to 100 r.p.m. and at temperatures of 50 to 100° C. (spindle MK 27).

4. Film Strength

Tear strength (=tensile stress at failure) is determined in accordance with DIN 53455 (ISO 527.2-1985).

What is claimed is:

1. A process for binding a plurality of individual pages comprising an inner book, said process comprising:

(a) coating an edge of said the inner book with a layer of an electromagnetic radiation curable material which material comprises at least one photoinitiator and at least one adhesive (A) which, in the presence of such photoinitiator, is capable of a radical or cationic reaction induced by UV or other electromagnetic radiation having a wavelength below 600 nm and which has a viscosity at application temperature of 0.1 to 20 Pas;

(b) exposing the layer of material to electromagnetic radiation having a wavelength below 600 nm to induce a reaction and to set the layer of adhesive (A);

(c) applying a layer of adhesive (B) to the edge coated with the layer of set adhesive (A); and (d) affixing a cover or liner to the edge of the inner book utilizing the adhesive (B).

2. The process of claim 1, wherein the layer of the electromagnetic curable material has a thickness of less than 0.2 mm.

3. The process of claim 1 wherein after the coating the layer of material comprising adhesive (A) is exposed to UV radiation with a wavelength of about 400 nm to about 250 nm.

4. The process of claim 1 wherein adhesive (B) is a hotmelt adhesive.

5. The process of claim 1 wherein adhesive (B) is a dispersion adhesive.

6. The process of claim 1 wherein adhesive (B) has a viscosity at application temperature of 1 to 20 Pas.

7. The process of claim 1 wherein adhesive (B) is comprised of a resin selected from the group consisting of polyamides, polyurethanes, and copolymers of at least one ethylenically unsaturated monomer with at least one comonomer selected from the group consisting of vinyl acetate, acrylic acid, methacrylic acid and esters of acrylic acid and esters of methacrylic acid.

8. The process of claim 7 wherein adhesive (B) is additionally comprised of at least one further component selected from the group consisting of waxes, plasticizers, and resins which increase adhesive strength and adhesion.

9. The process of claim 1 wherein adhesive (B) is a dispersion adhesive comprised of at least one polymer selected from the group consisting of polyvinyl acetates, polyacrylates, polyvinylidenes, polyurethanes, polychloroprenes and rubbers.

10. The process of claim 1 wherein adhesive (B) is a homopolymeric plasticizer-modified polyvinyl acetate dispersion.

11. The process of claim 1 wherein adhesive (B) is a hotmelt adhesive comprised of an ethylene/vinyl acetate copolymer.

12. The process of claim 1 wherein adhesive (A) is comprised of one or more components selected from the group consisting of aliphatic epoxides, acrylate monomers, acrylate-modified polymers and mixtures thereof.

13. The process of claim 1 wherein the at least one photoinitiator is a photoinitiator which produces a Lewis acid or Brönsted acid under the effect of electromagnetic radiation.

14. The process of claim 1 wherein the at least one photoinitiator is a complex onium compound.

15. The process of claim 1 wherein the at least one photoinitiator is a complex onium compound selected from the group consisting of aromatic sulfonium salts and aromatic iodonium salts.

16. The process of claim 1 wherein the at feast one photoinitiator is a photoinitiator capable of initiating radical polymerization of olefinically unsaturated double bonds on exposure to light with a wavelength of about 260 nm to about 480 nm.

17. The process of claim 1 wherein the at least one photoinitiator is selected from the group consisting of benzoin, benzoin derivatives, phenyl hydroxyalkanones and thioxanthones.

18. The process of claim 1 wherein the at least one photoinitiator is a polymer-bound photoinitiator.

19. The process of claim 1 wherein the at least one photoinitiator is a sulfonium salt, adhesive (A) is comprised of a cycloaliphatic epoxy resin, and the adhesive system is additionally comprised of one or more polyols.

20. The process of claim 1 wherein said adhesive (Al layer film when set has a film strength of more than 5 N/mm$^2$.

21. The process of claim 1 wherein the viscosity of adhesive (A) at application temperature is 0.1 to 10 Pas.

22. The process of claim 1 wherein the viscosity of adhesive (A) at application temperature is 100 to 1000 mPas.

23. The process of claim 1 wherein adhesive (A) is comprised of at left one polymer with a molecular weight of at least 800.

24. The process of claim 1 wherein adhesive (A) is comprised of at least one polymer with a molecular weight of at least 800 selected from the group of polyacrylates, polyesters and polyurethanes.

25. The process of claim 1 wherein adhesive (A) is comprised of at least one polymer containing at least one functional group polymerizable by electromagnetic radiation and at least one functional group polymerizable by reaction with a compound containing at least one acidic hydrogen atom.

26. The process of claim 1 wherein adhesive (A) is comprised of at least one low molecular weight epoxide.

27. The process of claim 1 wherein adhesive (A) is comprised of at least one high molecular weight epoxide.

28. The process of claim 1 wherein adhesive (A) is comprised of up to 30% by weight of a compound containing only one epoxy group, 10 to 40% by weight of a compound containing two or more epoxy groups, and a compound containing at least one OH group with a number average molecular weight of less than 400.

29. The process of claim 1 wherein the photoinitiator is attached to a polymeric component of adhesive (A).

30. The process of claim 1 wherein the adhesive (A) is additionally comprised of a coinitiator, a photosensitizer, or both a coinitiator and a photosensitizer.

31. The process of claim 1 wherein the photoinitiator contains a functional group polymerizable by exposure to said electromagnetic radiation.

32. The process of claim 1 wherein adhesive (A) is comprised of about 0.5 to about 8% by weight of a monofunctional reactive diluent.

33. The process of claim 1 wherein adhesive (A) is comprised of a compound containing at least two acidic hydrogen atoms as a hardener.

34. The process of claim 33 wherein said compound is a polyol bearing least two OH groups.

35. The process of claim 1 wherein adhesive (A) is comprised of at least one additive selected from the group consisting of plasticizers, stabilizers, antioxidants, dyes, thermoplastic polymers, hydrophilic polymers and fillers.

* * * * *

UNITED STATES PATENT AND TRADEMARK OFFICE
CERTIFICATE OF CORRECTION

PATENT NO. : 6,607,629 B2
DATED : August 19, 2003
INVENTOR(S) : Onusseit

It is certified that error appears in the above-identified patent and that said Letters Patent is hereby corrected as shown below:

Column 22,
Line 66, delete "said".

Column 23,
Line 63, delete "feast", and insert therefore -- least --.

Column 24,
Line 14, delete "(Al", and insert therefore -- (A) --.
Line 15, delete both occurrences of the word "film".
Line 21, delete "left", and insert therefore, -- least --.
Line 25, after "group", insert -- consisting --.
Line 58, after "bearing", insert -- at --.

Signed and Sealed this

Twenty-first Day of September, 2004

JON W. DUDAS
*Director of the United States Patent and Trademark Office*